United States Patent [19]

Enomoto

[11] Patent Number: 5,083,502
[45] Date of Patent: Jan. 28, 1992

[54] COFFEE MAKING MACHINE
[75] Inventor: Kazuo Enomoto, Kobe, Japan
[73] Assignees: Nichimen Corporation, Tokyo; Kazuo Enomoto, Hyogo, both of Japan
[21] Appl. No.: 474,046
[22] PCT Filed: Sep. 1, 1989
[86] PCT No.: PCT/JP89/00901
§ 371 Date: Apr. 24, 1990
§ 102(e) Date: Apr. 24, 1990
[87] PCT Pub. No.: WO90/02507
PCT Pub. Date: Mar. 22, 1990
[30] Foreign Application Priority Data
Sep. 2, 1988 [JP] Japan .................. 63-116173
[51] Int. Cl.$^5$ ............................... A47J 31/42
[52] U.S. Cl. ..................... 99/286; 99/287; 99/288; 99/307; 241/65
[58] Field of Search ........... 99/279, 286, 288, 289 R, 99/290, 287, 307; 241/65; 426/433

[56] References Cited
U.S. PATENT DOCUMENTS
4,510,853  4/1985  Takagi ................... 241/65
4,706,555  11/1987  Nakamura ............... 99/286

FOREIGN PATENT DOCUMENTS
3518243  12/1960  Japan.

Primary Examiner—Robert W. Jenkins
Attorney, Agent, or Firm—Kenyon & Kenyon

[57] ABSTRACT

A coffee making machine for automatically producing coffee solution from unroasted coffee beans comprises a roaster for holding coffee beans and roasting the dried coffee beans into roasted coffee beans, a milling/extracting unit for grinding the roasted coffee beans into ground coffee and extracting coffee solution from the ground coffee, a blower for blowing air into the milling/extracting unit to cool the roasted coffee beans before they are ground, a pouring unit for pouring hot water onto the ground coffee and extracting the coffee solution therefrom, a coffee server for receiving the coffee solution from the milling/extracting unit, and means for supplying the coffee solution from the milling/extracting unit to the coffee server. The operation of the roaster, the supply of roasted coffee beans from the roaster to the milling/extracting unit, and the operation of the milling/extracting unit, the blower and the pouring unit are automatically performed at predetermined timings.

6 Claims, 3 Drawing Sheets

COFFEE MAKING MACHINE

TECHNICAL FIELD

This invention relates to a coffee making machine and more particularly to a coffee making machine for automatically obtaining coffee from unroasted coffee beans.

BACKGROUND ART

There have been proposed coffee making machines in which roasted coffee beans are ground and the coffee solution is extracted from the ground coffee. In the conventional coffee making machines, ground coffee must be stored at coffee serving locations in order to serve coffee to users any time they want it. However, if coffee beans are not used shortly after they have roasted within a week, their flavor deteriorates. This brings about the problem in which the conventional coffee making machine cannot always provide users with coffee having full taste and aroma any time they want to drink it.

The object of the present invention is to provide a coffee making machine which overcomes the problems occurring in the conventional coffee making machine and may automatically obtain coffee from unroasted coffee beans in a short time.

DISCLOSURE OF THE INVENTION

A coffee making machine according to the present invention comprises a first container for housing coffee beans, a roaster having roasting means for roasting the coffee beans, a second container for receiving the roasted coffee beans, a milling/extracting unit including both milling means for grinding roasted coffee beans into ground coffee and a filter for extracting coffee solution from the ground coffee, means for conveying the roasted coffee beans from the roaster to the milling/extracting unit, a blower for blowing air into the second container to cool the roasted coffee beans before coffee solution is extracted, a pouring unit for pouring hot water onto the ground coffee so as to be extracted, a coffee server for receiving the coffee solution, and mean for supplying the coffee solution from the milling-/extracting unit to the coffee server.

BEST MODE FOR CARRYING OUT THE INVENTION

Figure 1:
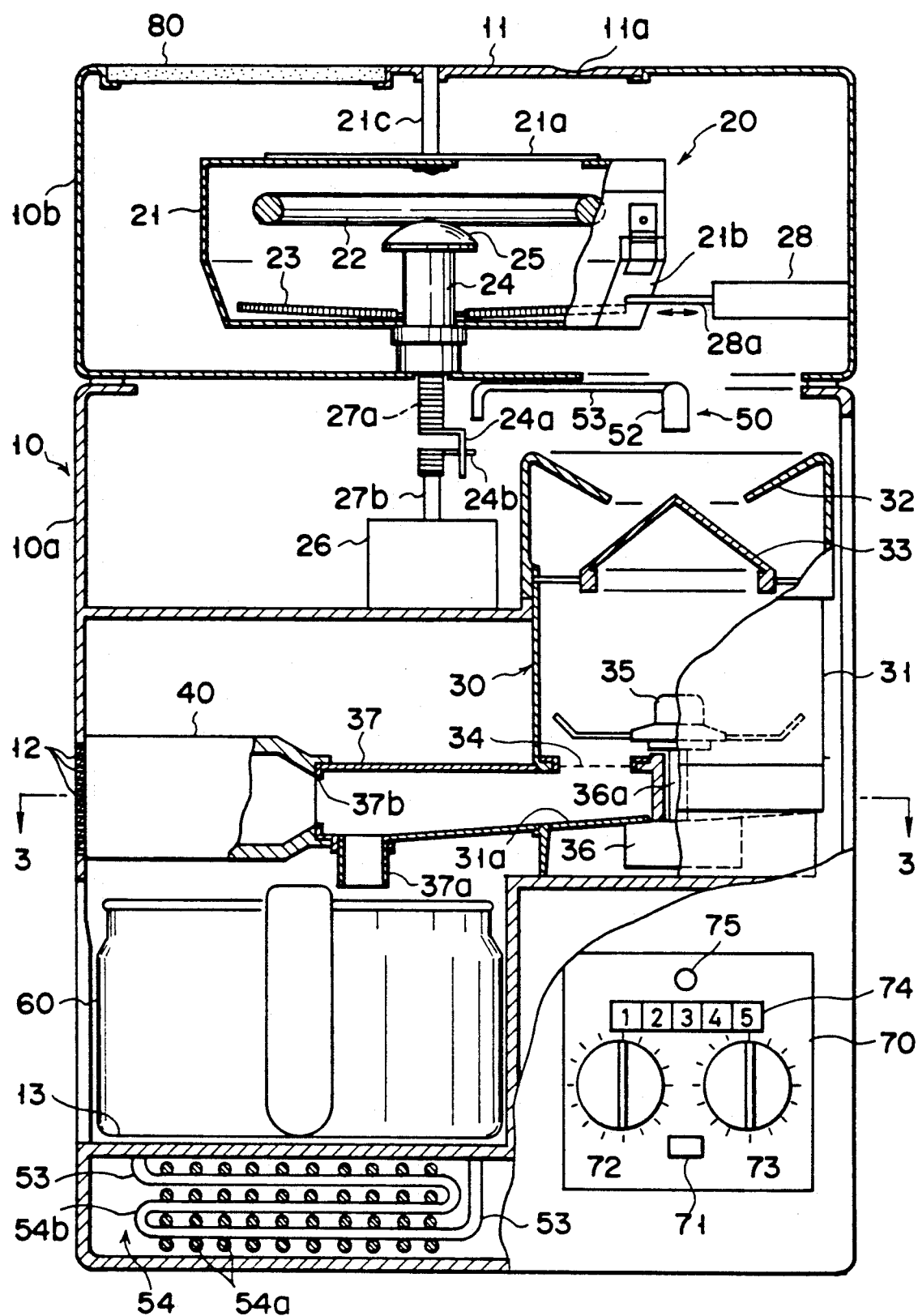
FIG. 1 is a longitudinal sectional view of a coffee making machine according to one embodiment of the present invention.
Figure 2:
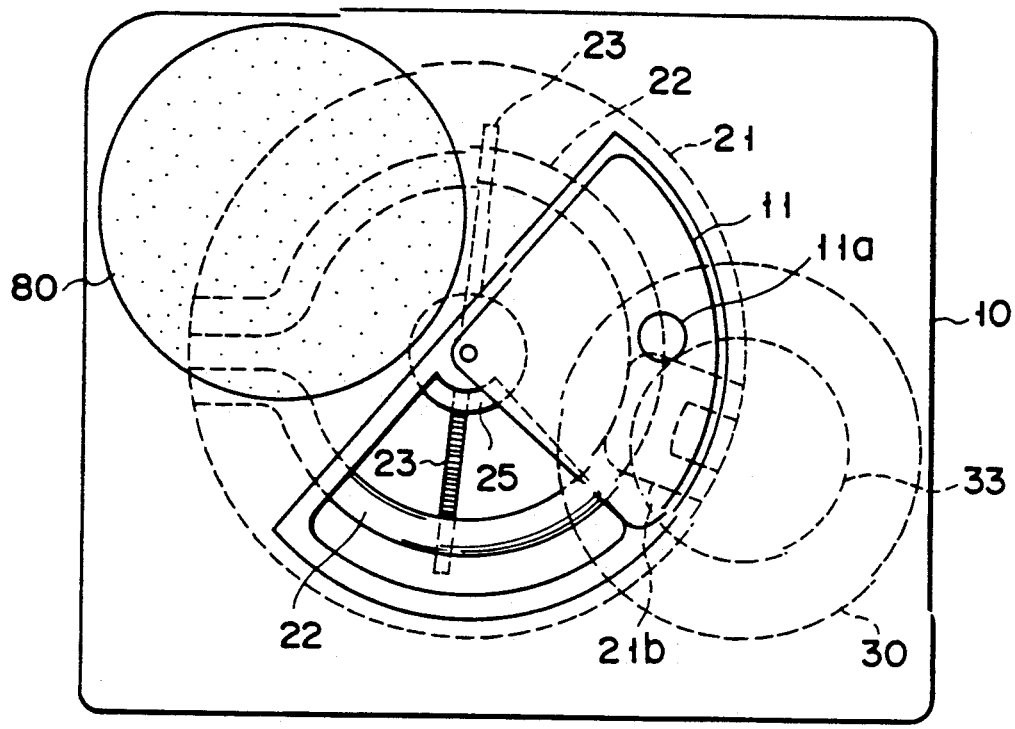
FIG. 2 is a plan view of FIG. 1.

A coffee making machine according to one embodiment of the present invention will now be explained with reference to the drawings.

A substantially rectangular outer casing 10 comprises a lower casing 10a open at its bottom and an upper casing 10b detachably connected to the top end of the lower casing 10a. The upper casing 10b houses a roaster 20, while the lower casing 10a houses a milling/extracting unit 30, a blower 40 for blowing cooling air into the milling/extracting unit 30, a pouring unit 50 for pouring very hot water onto ground coffee in the milling/extracting unit 30, and a coffee server 60 for receiving coffee solution filtered from ground coffee in the milling/extracting unit 30. An operation panel 70 is fixed to the front wall of the lower panel 10a, and a smoke-removing/deodorizing unit 80 is provided in the top wall of the upper casing 10b.

The roaster 20 is adapted to rotate unroasted coffee beans contained therein and comprises a cylindrical container 21, a ring-shaped far-infrared heater 22 mounted in the upper portion of the container 21, and stirring blades 23 rotatable along the inner bottom wall of the container 21. Each of the stirring blades 23 is formed of an elastic coiled bar, the blades being connected to nut 24 such that they extend radially outward therefrom. The nut 24 comprises a cylindrical nut body and a shield member 25 formed on the top of the nut body and having the shape of a cylindrical segment extending perpendicularly outward from the nut body, so that the nut 24 has a T-shaped longitudinal cross section. A first rotary shaft 27a extends perpendicularly through the base wall of the upper casing 10b, and its upper end is screwed into an inner portion of the nut body. An intermediate portion of the first rotary shaft 27a is rotatably supported by a bearing fixed to the base wall of the upper casing 10b, and the lower portion of the shaft 27a which is situated in the lower casing 10a has a coil spring wound therearound and formed with a first elastic engaging portion 24a extending linearly and vertically downward. A second rotary shaft 27b is provided coaxilly under the first rotary shaft 27a at a predetermined space therefrom. The shaft 27b is connected to a driving source 26 constructed by a motor and a reduction device and is rotated by the motor through the reduction device. Around the upper portion of the second rotary shaft 27b is wound a second coil spring having a second engaging portion 24b extending horizontally to engage the first engaging portion 24a. As the second shaft 27a is rotated, the stirring blades 23 are turned via the assembly of the engaging portions 24a and 24b and the nut 24. Formed in the upper circular wall of the container 21 is a sectorial aperture through which dried coffee beans can enter the container 21. On the upper surface of the container 24 is formed a sectorial lid 21a which selectively opens and closes the aperture by its sliding rotation. A coffee bean outlet is formed in a section extending from the under wall to an intermediate portion of the lateral wall of the container 21.

A roasted bean ejecting shutter 21b is pivoted horizontal to the peripheral wall of the container 21 at its upper side edge so as to selectively close and open the coffee outlet.

A driving mechanism is provided for selectively opening and closing the shutter 21b and comprises an actuating rod 28a and a plunger 28 fixed to the upper casing 10b. The operation plunger 28 is operated automatically by means of an operation switch 71 mounted on the panel 70. Specifically, until the switch 71 is depressed, the plunger 28 is electrically non-conductive, and the actuating rod 28a rests at the extreme left position as viewed in FIG. 1, closing the dried coffee ejecting shutter 21b. On the other hand, the plunger 28 becomes conductive a predetermined period of time after the switch 72 has been depressed, and the actuating rod 21b is moved to the extreme right position, causing the dried coffee ejecting shutter 21b to be rotated so as to open the dried coffee bean outlet.

The driving mechanism for opening the dried coffee bean ejecting shutter 21b automatically can be substituted for by a manually operable member mounted on the outer casing 10.

A rotatable connecting rod 21c is disposed between the upper walls of the container 21 and the upper casing 10b so that its upper end of the rod 21c is connected to the center of the upper wall of the container 21, and the lower end thereof is connected to the upper wall of the upper casing 10b. The pivot portion of the sectorial lid 21a is fixed to the lower end portion connecting rod 21, and the pivot portion of a sectorial lid 11 is fixed to the upper end portion of the same. The lid 11 is rotatably provided on the upper surface of the top wall of the upper casing 10b, to selectively open and close a sectorial aperture formed in the top wall of the same. Formed in the lid 11 is finger hole 11a by means of which the lid 11 can be rotated by the user inserting the tip portion of a finger thereinto, the lid 21a being rotated together with the lid 11 via the connecting shaft 21c, thereby to selectivity open and close the dried coffee bean inlet aperture.

The function of the milling/extracting unit 30 is to grind the coffee beans supplied thereto after being roasted by the roaster 20, so that the ground coffee is mixed with water and then coffee solution is extracted from the mixture. The main body 31 of the milling/extracting unit 30 is a bottomed cylindrical container and is arranged such that its upper opening is situated underneath the dried coffee bean ejecting outlet. Formed on the upper end of the main body 31 is an inner flange 32 which extends in an inward and downward inclined state and defines a central aperture. Underneath and close to the main body 32 is disposed a conical guide member 33, the part (i.e. the central part) of which extends into the central aperture of the inner flange 32 and the lower peripheral edge of which is separated from the inner peripheral wall of the main body 31 by a predetermined distance. A grinding blade unit 35 is rotatably provided under the guide member 33 of the main body 31 and is connected to a rotary shaft 36a extending upwardly from a driving source 36. As the driving source 36 is driven, the grinding blade unit 35 is rotated by the rotary shaft 36a. The filter 34 made of an annular stainless mesh plate is horizontally and detachably provided between the bottom face of the main body 31 and the grinding blade unit 35. The outer and inner peripheral edges of the filter 34 are supported on the inner peripheral face of the main body 31 and the outer peripheral surface of a cylindrical bearing rotatably carrying the rotary shaft 36a, respectively. The bottom face of the main body 31 is slightly inclined, and the proximal end of a coffee supply tube 37 having an inclined bottom face situated at substantially the same level as the bottom face of the main body 31 is connected to the downstream portion of the bottom face of the main body 31. The proximal end of the coffee supply tube 37 is detachably connected to the outlet portion of the above-mentioned blower 40 so that an opening at the proximal end of the coffee supply tube 37 is positioned between the filter 34 and the inclined bottom face of the main body 31. On the portion of the bottom face of the coffee supply tube 37 which is disposed close to the distal end thereof is formed a coffee outlet 37a extending down toward the coffee server 60.

The blower 40 is connected to the inner lateral wall of the lower casing 10a and blows air drawn through an air inlet 12 into the interior of the main body 31.

Figure 3:
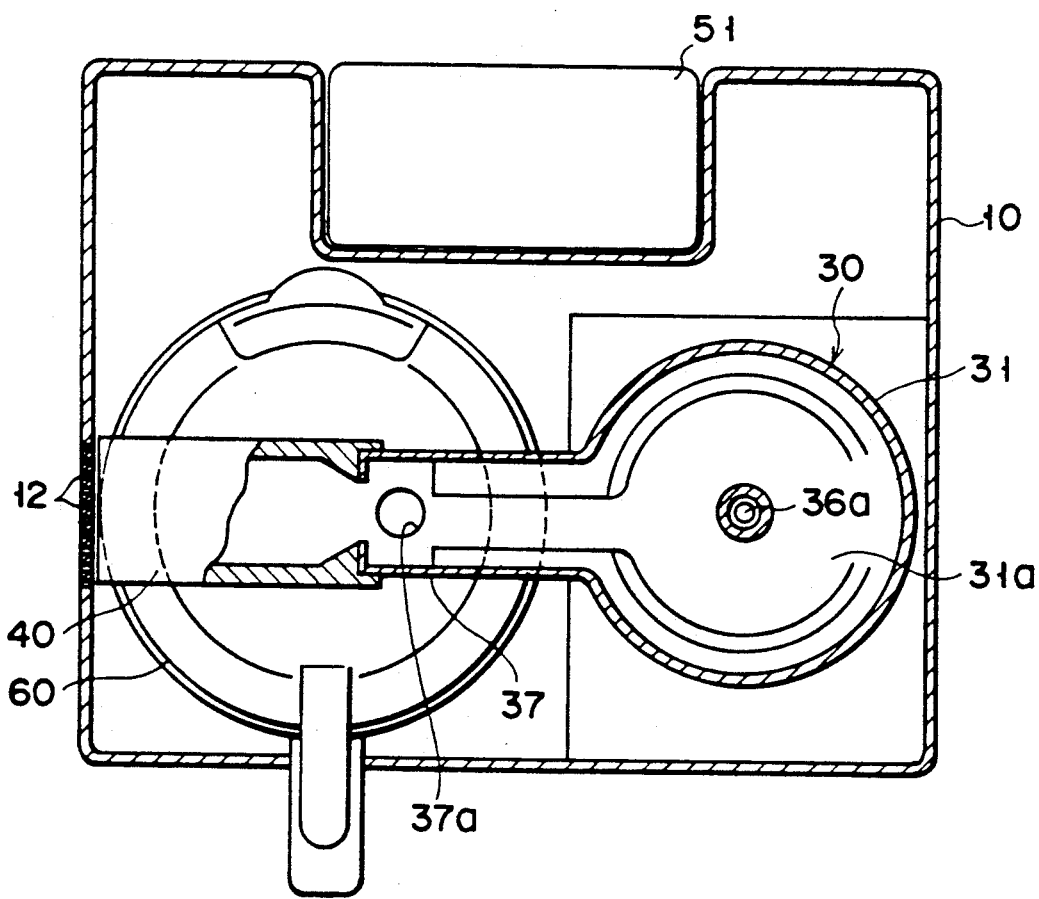
FIG. 3 is a cross sectional view along line 3—3 of FIG. 1.
Figure 4:
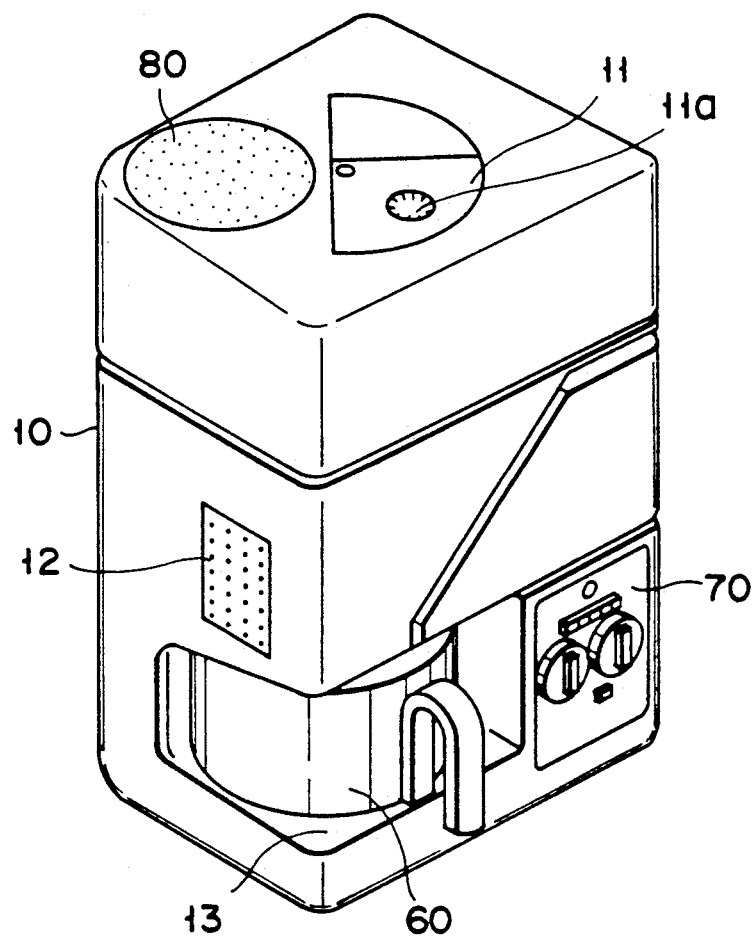
FIG. 4 is a perspective view of the coffee making machine of FIG. 1.

The pouring unit 50 comprises a cartridge type water tank 51 (see FIG. 3), a water supply tube 53 for supplying water from the water tank 51 to a water nozzle 52 provided above the milling/extracting unit 30, an instantaneous heating type heat exchanger 54 disposed at an intermediate portion of the water supply tube 53 so as to heat water flowing through the supplying tube 53. The heat exchanger 54 comprises a heater 54a provided between the bottom plate of the lower casing 10a and a base 13 on which the coffee server 60 is located, and a heat exchanging coil 54b.

The operation panel 70 is for operating a control unit mounted within the outer casing 10 and comprises an operation switch 71, a roast timer 72, a mill timer 73, a plurality of automatic push-buttons 74 and an operation lamp 75. The roast timer 72 sets the optimal roast time in accordance with the amount of coffee beans placed in accordance with the number of persons who want to drink coffee and controls the length of time the far-infrared heater 22 and the driving source 36 operate. Similarly, the mill timer 73 sets the grinding time in accordance with the amount of coffee beans and controls the length of time the driving source 36 operates. The automatic push-buttons 74 are five in number, bear numerals 1 to 5, and designate amounts of dried coffee beans to be supplied from the roaster 20 to the milling-/extracting unit 30, respectively. When the required one of the automatic push buttons 74 is depressed, the optimal roast time and the optimal grinding time are automatically selected by the control unit in accordance with the amount of ground coffee beans designated by the depressed push-button 74. Alternatively, when only the roasted timer 72 operates, only the dried coffee beans are ground during the time length selected by the roasted timer. Similarly, when only the mill timer 73 is set, only the milling and brewing coffee operations are carried out. If it happens that there is no water in the water tank 51, the heater 54a remains in the "off" state, and only the grinding operation of roasted coffee beans is carried out.

The coffee server 60 can be taken out freely from the lower casing 10a. Further, the milling/extracting unit 30 can also be taken out from the lower casing 10a, provided that it is disengaged from the blower 40.

The operation of the coffee making machine will now be described.

Let it be assumed that coffee is to be made for three persons and that the amount of the dried coffee beans used is 30 grams. First, the lid 11 is opened and 30 grams of the dried coffee beans are placed in the roaster 20. The water tank 51 filled with a predetermined amount of water is placed on the base 13. After the timers 72 and 73 have both been adjusted or after the required automatic push-button 74 has been depressed and then the operation push-button 71 has been depressed, the automatic coffee making operation starts: the far-infrared heater 22 of the roaster 20 and the driving source 26 are turned on and the dried coffee beans in the roaster 20 are roasted by means of the heater 22, while being stirred by the stirring blades 23. Since the first rotary shaft 27a to which the stirring blades 23 are connected is a predetermined distance apart from the second rotary shaft 27b which is connected to the driving source 26, the heat generated within the roaster 20 is not transmitted to the driving source 26 through the rotary shafts 27a and 27b. The rotation of the driving source 26 is smoothly transmitted to the stirring blades 23 by means of the two springs having engaging portions 24a and 24b. Further, the stirring blades 23 are elastic coiled bar members. Therefore, if the coffee beans happen to be caught in the space between the stirring blades 23 and the bottom of the container 21 while the coffee beans are being stirred, the elastic forces cause the caught coffee beans to be removed from the space so that a stable stirring condition is maintained. Since the coffee beans in the central portion of the container 21 are moved by the stirring blade 23 at a slower speed than those in the other parts thereof, they would normally be roasted excessively as compared with those in the outer other parts. However, the provision of the shield member 25 for blocking heat radiation from the heater 22 in the central portion of the container 21 reduces the roasting heat to a moderate degree so that the roasting area is heated evenly all over.

After the coffee beans have been roasted for a predetermined length of time—for example, for eight minutes—the shutter 21b is opened by the solenoid 28 for a predetermined time duration and the roasted beans fall into the main body 31 of the milling/extracting unit 31. Then, the blower 40 blows air from the outside into the main body 31 for several minutes, for example, to cool the roasted coffee beans therein, the air from the blower 40 being caused to flow upwardly into the main body 31 through the filter 34, thus cooling the coffee beans quickly and efficiently. Rapid cooling of the coffee beans allows them to maintain their aroma and to be ground evenly.

After the cooling operation has been finished, the grinding blade unit 35 is rotated from ten and several seconds to several tens of seconds to grind the roasted coffee beans.

After completion of the grinding, the heater 54a is turned on to heat water in the water supply tube 53 surrounded by the heat exchange coil 54b. The heated water in the water supply tube 53 is moved toward the water nozzle 52 and exits from the nozzle 52 at a temperature of, for example, 70° C., falls onto the conical surface of the guide member 33, spreading out from the center thereof to its peripheral edge without splashing, and smoothly flows into the milling/extracting unit 30. From the resultant mixture of the ground coffee and hot water, coffee solution is extracted by the filtering operation of the filter 34. When the water tank 51 becomes empty, the heater 54a is turned off, its operation time being approximately 5 to 6 minutes. On the other hand, when the tank 51 is filled with water and when a heat push-button, not shown, is depressed, the heater 54a maintains water in the water supply tube 53 at a required temperature.

The coffee solution filtered by the filter 34 flows into the coffee supply tube 37 and drips into the coffee server 60.

The above coffee-making process beginning with the supply of dried coffee beans to the container 1 and ending with the dripping of coffee into the coffee server 60 takes about fifteen minutes to complete.

In order to remove, from the roasted container, fragments of roasted coffee beans formed in the roaster during the roasting process, a slit may be formed in the bottom wall of the roaster 20, besides the roasted bean ejecting shutter 21b.

INDUSTRIAL APPLICABILITY

The present invention provides a very convenient coffee making machine which automatically carries out the steps of grinding dried coffee beans and brewing coffee and is very economical because it uses inexpensive and well preserved dried coffee beans. With this machine, roasted coffee beans are made from a required amount of dried coffee beans picked up from those which have been stored for a long time without losing their full taste and aroma such that they provide users with coffee having better flavor every time they want coffee than coffee made by the conventional coffee making machine. Further, the coffee making machine according to claim 1 enables roasted coffee beans to be ground evenly to render the extracting rate of coffee higher than the conventional casing.

According to yet another aspect of the invention a coffee making machine is provided in which dried beans are stirred very smoothly so as to be evenly roasted.

According to another aspect of the invention the shaft of the stirring blades in the roaster is separated from the shaft of the driving source such that heat is not transmitted from the roaster to the driving source thereby increasing the durability of the driving source. Further, the rotation of the driving source is transmitted to the stirring blades via spring means. Thus, the rotation of the driving source does not apply a forced rotational force to the stirring blades, thereby ensuring that the coffee beans in the roaster are stirred smoothly.

The coffee making machine of the invention can prevent dried coffee beans collected at the center of a roaster from being excessively roasted so that all beans in the roaster are roasted evenly.

Furthermore, the coffee making machine smoothly and evenly introduces hot water dropping from a water nozzle by being prevented from splashing by means of the conical guide.

The coffee making machine also cools roasted beans quickly to preserve the aroma of the roasted beans by flowing air from upward through the filter.

I claim:

1. A coffee making machine comprising:
    a roaster including a first container for housing coffee beans and roasting means for roasting said coffee beans into roasted coffee beans;
    a milling/extracting unit including a second container for receiving said roasted coffee beans, milling means for grinding said roasted coffee beans into ground coffee and a filter for extracting coffee solution from said ground coffee;
    means for supplying said roasted coffee beans from said roaster to said milling/extracting unit;
    a blower for blowing air into said second container to cool said roasted coffee beans before coffee solution is extracted;
    a pouring unit for pouring hot water on said ground coffee so as to cause coffee solution to be extracted from said ground coffee;
    a coffee server for receiving said coffee solution; and
    means for supplying said coffee solution from said milling/extracting unit to said coffee server.

2. A coffee making machine comprising:
    a roaster including a first container for housing coffee beans and roasting means for roasting said coffee beans into roasted coffee beans;
    a milling/extracting unit including a second container for receiving said roasted coffee beans, milling means for grinding said roasted coffee beans into ground coffee and a filter for extracting coffee solution from said ground coffee, said roasting means comprising stirring blades for stirring coffee beans, each of said stirring blades being made of an elastic spring member and rotating along an inner bottom face of said second container;

means for supplying said roasted coffee beans from said roaster to said milling/extracting unit;

a blower for blowing air into said second container to cool said roasted coffee beans before coffee solution is extracted;

a pouring unit for pouring hot water on said ground coffee so as to cause coffee solution to be extracted from said ground coffee;

a coffee server for receiving said coffee solution; and means for supplying said coffee solution from said milling/extracting unit to said coffee server.

3. A coffee making machine according to claim 2, wherein said roasting means comprises a first rotary shaft rotatably supported by said second container and fixed to said stirring blades, a driving source, a second rotary shaft provided separate from said first rotary shaft and rotated by said driving source, and spring means for transmitting rotation of said second rotary shaft to said first rotary shaft.

4. A coffee making machine comprising:

a roaster including a first container for housing coffee beans and roasting means for roasting said coffee beans into roasted coffee beans;

a milling/extracting unit including a second container for receiving said roasted coffee beans, milling means for grinding said roasted coffee beans into ground coffee and a filter for extracting coffee solution from said ground coffee, said roasting means comprising a ring-shaped far infrared heater provided at an upper portion of said second container, and a shield member disposed under a center of said heater for shielding heat radiated from said heater;

means for supplying said roasted coffee beans from said roaster to said milling/extracting unit;

a blower for blowing air into said second container to cool said roasted coffee beans before coffee solution is extracted;

a pouring unit for pouring hot water on said ground coffee so as to cause coffee solution to be extracted from said ground coffee;

a coffee server for receiving said coffee solution; and means for supplying said coffee solution from said milling/extracting unit to said coffee server.

5. A coffee making machine comprising:

a roaster including a first container for housing coffee beans and roasting means for roasting said coffee beans into roasted coffee beans;

a milling/extracting unit including a second container for receiving said roasted coffee beans, milling means for grinding said roasted coffee beans into ground coffee and a filter for extracting coffee solution from said ground coffee;

means for supplying said roasted coffee beans from said roaster to said milling/extracting unit;

a blower for blowing air into said second container to cool said roasted coffee beans before coffee solution is extracted;

a pouring unit for pouring hot water on said ground coffee so as to cause coffee solution to be extracted from said ground coffee;

a coffee server for receiving said coffee solution; and means for supplying said coffee solution from said milling/extracting unit to said coffee server, said milling/extracting unit including a conical guide member having a central portion for directly receiving hot water from said pouring unit, and an inclined outer surface for guiding said hot water from said central portion to a lower peripheral end of said inclined outer surface.

6. A coffee making machine comprising:

a roaster including a first container for housing coffee beans and roasting means for roasting said coffee beans into roasted coffee beans;

a milling/extracting unit including a second container for receiving said roasted coffee beans, milling means for grinding said roasted coffee beans into ground coffee and a filter for extracting coffee solution from said ground coffee;

means for supplying said roasted coffee beans from said roaster to said milling/extracting unit;

a blower for blowing air into said second container to cool said roasted coffee beans before coffee solution is extracted, said blower including means for blowing air onto said roasted coffee beans upwardly through said filter;

a pouring unit for pouring hot water on said ground coffee so as to cause coffee solution to be extracted from said ground coffee;

a coffee server for receiving said coffee solution; and means for supplying said coffee solution from said milling/extracting unit to said coffee server.

* * * * *

UNITED STATES PATENT AND TRADEMARK OFFICE
CERTIFICATE OF CORRECTION

PATENT NO. : 5,083,502
DATED : January 28, 1992
INVENTOR(S) : Kazuo Enomoto

It is certified that error appears in the above-indentified patent and that said Letters Patent is hereby corrected as shown below:

On the title page, Item [30], change the Foreign Application Priority Data from" ...63-116173" to -- ...63-116173[U] --.

Signed and Sealed this

Third Day of August, 1993

Attest:

MICHAEL K. KIRK

*Attesting Officer*    Acting Commissioner of Patents and Trademarks